(12) United States Patent
Jussel (10) Patent No.: US 11,628,048 B2
(45) Date of Patent: Apr. 18, 2023

(54) DENTAL TREATMENT DEVICE (71) Applicant: Ivoclar Vivadent AG, Schaan (LI)

(72) Inventor: Rudolf Jussel, Feldkirch-Gisingen (AT)

(73) Assignee: Ivoclar Vivadent AG, Schaan (LI)

( * ) Notice: Subject to any disclaimer, the term of this patent is extended or adjusted under 35 U.S.C. 154(b) by 422 days.

(21) Appl. No.: 16/496,667

(22) PCT Filed: Apr. 10, 2018

(86) PCT No.: PCT/EP2018/059163
§ 371 (c)(1),
(2) Date: Sep. 23, 2019

(87) PCT Pub. No.: WO2018/189181
PCT Pub. Date: Oct. 18, 2018

(65) Prior Publication Data
US 2020/0038152 A1 Feb. 6, 2020

(30) Foreign Application Priority Data
Apr. 12, 2017 (EP) ...................................... 1716623

(51) Int. Cl.
*A61C 13/20* (2006.01)
*F27B 5/18* (2006.01)
*F27B 17/02* (2006.01)

(52) U.S. Cl.
CPC ................ *A61C 13/20* (2013.01); *F27B 5/18* (2013.01); *F27B 17/025* (2013.01)

(58) Field of Classification Search
None
See application file for complete search history.

(56) References Cited

U.S. PATENT DOCUMENTS 1,534,592 A * 4/1925 Houck .................... F27B 17/02
                                                            219/390
3,441,652 A * 4/1969 Robert ................... A61C 13/00
                                                            219/390
(Continued)

FOREIGN PATENT DOCUMENTS

CN          104024779 A  *  9/2014  ............. A61C 13/20
CN          106322983 A  *  1/2017
(Continued)

OTHER PUBLICATIONS

Labolight Duo, GC Europe N.V. Research Park Interleuvenlaan 33 B-3001 Leuven Belgium, Pages EN 9 and 18-20 (Year: 2015).*
(Continued)

*Primary Examiner* — Michael G Hoang
*Assistant Examiner* — Kurt J Wolford
(74) *Attorney, Agent, or Firm* — Ann M. Knab; Thad McMurray (57) ABSTRACT A dental treatment device with an energy source is provided which is arranged at least partially in or on a working chamber, comprising a stamp which is movable in relation to the dental treatment device as for the rest and which comprises a receiving plate for dental restoration parts. It is provided that the working chamber has a through-opening at the top, into which the receiving plate (16) is at least partially movable. Further, a drive is provided for the transfer of the stamp from a working position into a presentation position, and optionally vice versa. A cover (32) is mounted, in particular hinged, on the dental treatment device as for the rest, by which cover the through-opening (26) is closable.

16 Claims, 10 Drawing Sheets

(56) References Cited

U.S. PATENT DOCUMENTS

| | | | |
|---|---|---|---|
| 3,952,408 A | 4/1976 | Docx | |
| 4,139,341 A * | 2/1979 | Pfaffenbauer | F27B 17/02 |
| | | | 432/184 |
| 4,272,670 A * | 6/1981 | Docx | F27B 5/04 |
| | | | 219/390 |
| 4,332,553 A * | 6/1982 | Earle | F27B 5/04 |
| | | | 266/250 |
| 4,498,866 A * | 2/1985 | Meislitzer | F27B 5/04 |
| | | | 432/239 |
| 4,702,696 A * | 10/1987 | Bunza | F27B 17/02 |
| | | | 432/205 |
| 5,104,591 A | 4/1992 | Masuhara et al. | |
| 5,545,875 A * | 8/1996 | de Sternberg | F27B 17/025 |
| | | | 219/431 |
| 5,997,293 A * | 12/1999 | Grunenfelder | F27B 17/025 |
| | | | 432/206 |
| 6,252,202 B1 * | 6/2001 | Zychek | F27B 17/025 |
| | | | 219/385 |
| 9,492,253 B2 * | 11/2016 | Rohner | F27B 17/025 |
| 9,733,018 B2 * | 8/2017 | Grunenfelder | F27D 19/00 |
| 9,784,501 B2 | 10/2017 | Jussel | |
| 10,101,088 B2 | 10/2018 | Schmidt et al. | |
| 2008/0237211 A1 * | 10/2008 | Jussel | F27B 17/025 |
| | | | 219/390 |
| 2013/0029279 A1 * | 1/2013 | Jussel | F27B 17/025 |
| | | | 432/23 |

FOREIGN PATENT DOCUMENTS

| | | | | |
|---|---|---|---|---|
| CN | 206019324 U | * | 3/2017 | .......... F27B 17/0033 |
| CN | 106885469 A | * | 6/2017 | |
| CN | 206875940 U | * | 1/2018 | .......... F27B 17/0016 |
| DE | 2114755 A1 | | 11/1971 | |
| DE | 4303458 C1 | * | 1/1994 | ............ F27B 17/025 |
| DE | 4433373 A1 | * | 3/1995 | ............ F27B 17/025 |
| DE | 19824497 A1 | | 12/1999 | |
| DE | 202010011110 U1 | * | 10/2010 | ............ F27B 17/025 |
| DE | 202011003179 U1 | | 2/2012 | |
| EP | E P-0091742 A2 | * | 10/1983 | ................ F27B 5/04 |
| EP | 0380345 B1 | * | 10/1993 | ........... A61C 19/003 |
| EP | 0887111 A2 | | 12/1998 | |
| EP | 1972303 A1 | * | 9/2008 | ........... A61C 13/206 |
| EP | 2551621 A1 | * | 1/2013 | ................ F27B 5/18 |
| GB | 348119 A | * | 5/1931 | ............. A61C 13/20 |
| JP | 228090 | | 2/1990 | |
| WO | WO-2008006599 A2 | * | 1/2008 | ............ F27B 17/025 |
| WO | WO-2012057829 A2 | * | 5/2012 | ............. C04B 35/48 |
| WO | WO-2012076134 A1 | * | 6/2012 | ............. A61C 13/20 |
| WO | WO-2013068312 A1 | * | 5/2013 | ............. F27D 19/00 |
| WO | WO-2018048377 A1 | * | 3/2018 | ................ F27B 5/18 |

OTHER PUBLICATIONS

Translation of CN-106322983-A (Year: 2017).*
Translation of WO-2008006599-A2 (Year: 2008).*
Translation of WO-2018048377-A1 (Year: 2018).*
Translation of CN-206875940-U (Year: 2018).*
Translation of CN-106885469-A (Year: 2017).*
Translation of CN-206019324-U (Year: 2017).*
Translation of CN-104024779-A (Year: 2014).*
Translation of WO-2013068312-A1 (Year: 2013).*
Translation of EP-2551621-A1 (Year: 2013).*
Translation of WO-2012076134-A1 (Year: 2012).*
Translation of WO-2012057829-A2 (Year: 2012).*
Translation of DE-202010011110-U1 (Year: 2010).*
Translation of DE-4433373-A1 (Year: 1995).*
Translation of DE-4303458-C1 (Year: 1994).*
Translation of EP-0091742-A2 (Year: 1983).*
EP-0380345-B1 with paragraph numbers (Year: 1993).*
Kanthal (Year: 2010).*
Kanthal Accessibility Date (Year: 2022).*
Parker (Year: 2012).*
Parker Accessibility Date (Year: 2022).*
English Translation of EP 1972303 A1 (Year: 2008).*
English Translation of JP H0228090 U (Year: 1990).*
English translation of CN 106322983 A (Year: 2022).*
English translation of JP H0228090 U (Year: 2022).*
McKinley (Year: 2015).*
Mosaic Trader NZ (Year: 2010).*
Mosaic Trader NZ accessibility date (Year: 2022).*

* cited by examiner

DENTAL TREATMENT DEVICE

CROSS-REFERENCE TO RELATED APPLICATIONS

This application is a National Stage application of International patent application PCT/EP2018/059163 filed on Apr. 10, 2018, which claims priority to European patent application No. 17166238.0 filed on Apr. 12, 2017, the disclosures of which are incorporated herein by reference in their entirety.

FIELD OF THE INVENTION

The invention relates to a dental treatment device.

BACKGROUND OF THE INVENTION

Dental treatment devices, including dental furnaces, sintering furnaces, polymerization devices and drying furnaces, are realized with different opening mechanisms.

Typically, a head of the dental treatment device has a cavity accessible from below which forms the firing chamber or possibly the pressing chamber. A firing chamber base forms a receiving plate for dental restoration parts.

This firing chamber is surrounded by a possibly polygonal annular heating device as an energy source. The annular heating device may be in the form of a cylinder and/or a bottom heater and/or a top heater and/or light emitting unit and may have a spirally extending heating coil, or for example induction heater, microwave heater, optionally including a susceptor, or LED lighting or the like.

In combination with this furnace head, different opening approaches have been developed. On the one hand, it is possible to arrange the firing chamber bottom such that it may be displaced in the vertical direction. Opening of the firing chamber will then be done such that the firing chamber bottom is moved vertically downwards on a kind of lift, so that the dental restoration parts are freely accessible. For closing, the firing chamber bottom is moved upwards.

Alternatively, it is possible for the firing chamber bottom, as a base, to be firmly and stably supported and the furnace head itself to be configured such that it is displaceable. In this configuration it is possible to also allow vertical movement of the furnace head, or pivoting the furnace head.

In this approach, the cooling phase may as well be easily adjusted by partially pivoting the furnace head.

Solutions of that kind have been known for a long time. An improvement which is a combination of these two solutions may be found in DE 195 42 984 C1. According to this solution, a lifting mechanism and a swivel mechanism are combined such that the advantages of both solutions may advantageously be combined.

However, the known solutions suffer from the disadvantage that, depending on the relative position of the furnace head in relation to the firing chamber bottom, the energy from the working chamber sometimes keeps acting on the object or the environment or the operator. Moreover, accessibility for loading or removal and visibility to the dental restoration parts may not always be perfect. Therefore, the operator is required to bend down and, if necessary, squat down to have a good view of the dental restoration parts to be handled.

Moreover, the furnace head often is extremely hot, which necessarily does not make operation thereof any easier.

Even though dental treatment device herein is mentioned mainly as being dental furnaces and dental firing furnaces, it is to be understood that dental treatment devices other than furnaces are also relevant, such as for example, light curing devices that may have a corresponding light dome or light head, alternatively, preheating furnaces, which may as well comprise a corresponding head including an energy source and may be regarded as dental treatment device.

SUMMARY OF THE INVENTION

In contrast, the object of the invention is to provide a dental treatment device, which allows improved handling of dental restoration parts.

According to the invention, this object will be achieved by the claims. Advantageous embodiments will arise from the dependent claims.

According to the invention, the dental restoration parts in the presentation position are freely accessible in the manner of a presentation device, i.e. without a furnace head being arranged on top and compromising accessibility. It is therefore provided for them to be supported on a receiving plate with a stamp. Moreover, this stamp is moved from the bottom to the top throughout the dental treatment device, thus coming to rest in the presentation position at the top. "Top", in this case, means above the firing chamber.

According to the invention, the furnace head comprises an opening at the top, which may be configured as a through-opening. In particular, the through-opening extends through the top wall of the furnace head.

The diameter and the shape of this through-opening is widely adaptable to respective requirements. This also applies to the shape of the transition area in relation to the firing chamber or pressing chamber. These shapes may be congruent to each other, they may match each other, but it is also possible for the shape of the firing chamber to extend inside the through-opening or vice versa.

According to the invention, it is advantageous for the user of inventive dental treatment device not to be required to work using heat protection gloves according to the processing instructions. The close proximity to the hot and open furnace head so far has required to prescribe appropriate handling.

Contrary to this, however, the invention, for the first time, provides for the dental treatment parts to be freely accessible. In addition, a receiving plate according to the invention for the dental restoration parts closes off the furnace head. Upon removing thereof, the firing chamber is thermally separated from the dental restoration parts.

Walls of the dental treatment device comprise an energy source element, preferably a heater, in a manner known per se.

Typically, the cover of the dental treatment device according to the invention does not have a heater, and therefore does not require any touch protection from an electrical point of view. Besides, the cover is able to be lifted in relation to the furnace head. Furthermore, the cover may also be swiveled sideways so that the ceiling is positioned above the dental restoration parts.

Preferably, the stamp, with its upper end, terminates at the receiving plate. The stamp may have a smaller diameter than the plate, or may have at most the same diameter. The receiving plate is retractable into the through-opening and preferably fits through the through-opening with a clearance of less than 5 mm, preferably 0.5 mm to 2 mm.

The stamp may also have a larger diameter than the receiving plate. On the one hand, this is either for a better closing off when in the open position or on the other hand, the receiving plate is inserted in the stamp and therefor is secured against lateral shifting, slipping.

This embodiment ensures that no dental restoration parts fall into the gap between the through-opening and the receiving plate.

The receiving plate may be planar, but it is also possible to provide recesses, for example in the form of concentric circles. Such shapes are especially suitable for depositing muffles and/or firing tray.

If the top edge of the receiving plate in the presentation position is flush with the furnace head, the handling area is comparatively large. It is then possible, for example, for the dental restoration parts upon completion of firing thereof, to be pushed aside and place the dental restoration parts which are still to be fired in an appropriately suitable position on the receiving plate.

While firing chamber or pressing chamber and furnace head and related terms are being addressed herein, it is to be understood that if the dental treatment device is realized in a form other than a furnace, then specific terms are to be understood herein, such as e.g. "head of the dental treatment device" instead of "furnace head" or "working chamber", or "working chamber" instead of "firing chamber".

According to the invention, the stamp, together with the receiving plate, is mounted relative to the remaining dental treatment device so that it is able to move in relation to it. It comprises a drive that performs the movement in a controlled manner. The drive may be an electric drive, for example a stepper motor including gear, a linear motor or the like, but may also be a pneumatic or hydraulic drive or a manual drive, eventually, for example a lever, through which the different positions of the stamp are approachable with the receiving plate.

Said positions include a working position and a presentation position. The working position is selected such that when arranging the receiving plate in the working position or the stamp in the working position, which corresponds to each other, the dental restoration parts may be treated in the desired way. This could include, for example, light curing of the dental restoration parts, if the dental treatment device is configured as a light curing device, or baking or crystallization or sintering when being realized as a dental firing or sintering furnace.

According to the invention, it is advantageous for the receiving plate to be inserted in a recess on the stamp. This prevents slipping during movement or during loading and unloading thereof, for example, using a support body which holds the dental object(s) to be processed. As a result, the receiving plate is also secured against tilting while displacing the stamp.

According to the invention, it is advantageous for the receiving plate, while in the working position, to rest in or on a receiving floor or a firing chamber floor. Said floors thus forming a stop for the downward movement, and thus a reference point. This may be used as the zero point when adjusting the movement of the stamp.

According to the invention, it is provided for the presentation position to be above the working position. For transferring from the working position to the presentation position, the stamp and thus the receiving plate is moved upwards by the drive. It is to be understood, that movement and thus alignment of the stamp does not have to be exactly vertical. According to a modified embodiment, an inclined upward movement, i.e. one along an inclined path, is provided.

According to a modified embodiment, it, in addition, is also possible to move the stamp with the receiving plate further downwards than to the bottom of the firing chamber. In this embodiment, a through-opening is provided through which the receiving plate or at least the stamp may pass.

It is also possible to solely move the stamp further downwards, so that the stamp leaves the firing chamber in the downwards direction, while the receiving plate still remains at the bottom of the firing chamber. This embodiment is particularly suitable for maintenance purposes, where the drive and various parts of the stamp and the receiving plate can be cleaned and serviced. Alternatively, the stamp can be moved all the way up for maintenance so that maintenance can be done from above.

The receiving plate can be fixedly mounted on the stamp. Alternatively, it is mounted such that it can move to a certain degree, e.g. elastically within a flexibility of e.g. 5 mm. Moreover, the flexible bearing enables the drive to compensate for inclined positions relative to the dental treatment device as for the rest. It may also rest freely on the stamp.

In another particularly preferred embodiment, it is provided for the stamp with the receiving plate being in the presentation position to close off the firing chamber at its upper wall. Above the firing chamber, free flowing lateral air supply ensures rapid cooling of the dental restoration parts.

In contrast, the stamp with the receiving plate prevents vertical air circulation from passing through the through-opening. The cooling gradient in the furnace head and especially at the heating elements is kept lower, which is beneficial to the service life of the heating elements by reducing thermal stress. The energy may also be stored and used for a subsequent process step, e.g. for pre-drying a dental restoration.

In this position, the heating element and the stamp may suitably be preheated, if necessary.

According to the invention, it is also advantageous for a cover to be provided which is directly or indirectly attached to the dental treatment device. The cover closes the furnace head when the stamp with the receiving plate is lowered into the working position. It preferably enters into the through-opening from above, thus closing it, especially with a positive fit. The movement of the cover may be synchronized with the movement of the stamp such that the cover is being lifted as soon as the stamp lifts up the receiving plate from the working position.

However, de-synchronization is also possible, such that the cover will not be lifted before the dental restoration parts on the receiving plate are just below the cover. Preferably, the drive is made such that the cover cannot come into contact with the dental restoration parts.

In a comparatively simple embodiment, the cover has three or more legs that protrude into the through-opening, passing therethrough. These legs abut on the outer circumference of the receiving plate, so that the cover is lifted automatically when it is approached by the receiving plate.

Preferably, the cover centers itself automatically in or at the through-opening by the lowering operation.

The cover preferably has a seat at the through-opening. For example, a part of the cover may protrude into the through-opening and a circumferential flange may abut on the outer edge thereof.

Various other embodiments for the cover are also possible without leaving the scope of the invention.

For example, the cover may also be lifted up by a drive from above. It is also possible to swivel the cover away, either diagonally upwards or laterally.

In another modified embodiment, the cover is pushed sideways, thus being removed from the handling area for the user.

It is preferred for the cover not to interfere with the operation of the dental treatment device in the presentation position. The cover preferably has very low weight, e.g. less than one tenth of the weight of the furnace head. In its closed position, it operates as a thermal insulation and/or light insulation and/or sealant.

The dental treatment device according to the invention is not limited to a cylindrical working chamber. It is preferred for the diameter and height of the working chamber to be compact, for example 40 mm to 100 mm in diameter and 20 mm to 120 mm in height.

However, it may also be advantageous to realize an embodiment that is not circular, as viewed in top view, for example a square embodiment, a rectangular embodiment or an elliptical embodiment. Such an embodiment also allows treatment of non-circularly symmetrical dental restoration parts, in particular elongated dental restoration parts, such that a comparatively small firing chamber and higher efficiency may be attained.

This also makes it possible to realize rapid and energy-efficient heating and thus fast firing cycle when using the firing chamber according to the invention. In addition, with firing chamber being adapted, the size may be kept small and, if necessary, the required volumes of process gases, e.g. argon, can be kept small.

In another advantageous embodiment, it is provided for the receiving plate to be lifted so far that automatic loading and feeding can be performed. For this purpose, for example, a fork can be traveled sideways to accommodate the dental restoration part(s) or a support with the dental restoration part in place. By means of the lateral movement, the dental restoration parts can be brought into the position on the receiving plate, but can also be removed therefrom, by the interaction of the fork and the punch. For example, by lifting.

It is to be understood that instead of pure linear movements, multi-dimensional movements also are possible, if necessary.

In the advantageous embodiment of the invention, a heating is provided as part of the energy source in the area of the receiving plate and/or stamp. This solution makes it possible to reduce the temperature gradient in the working area, even to zero, if necessary. It is to be understood that such a heater may be combined with annular heating elements, as described above, to allow for the temperature gradient to be adjusted in any desired way.

The annular heating element may also be divided. It is therefore possible to switch on only the upper portion, if the firing chamber is decreased in size when being adapted to the low height of the dental restoration elements. In this case, the stamp or the receiving plate will cover the lower part of the heating element so that switching on the lower portion may be omitted.

It is also possible to form a support body, which is for receiving dental restoration parts on the receiving plate, as a firing table. Such a firing table may be underrun by a fork of a loading device, so that an automatic loading is possible.

Such a firing table can also be double-leveled, such that an annular supporting surface is formed as a first lower level, while a base of the double-level firing table extends through this surface and while an annular surface, for example a circular ring-shaped surface, is formed on the upper level, on which further dental restoration parts may be accommodated.

According to the invention, significant decrease of overall process time is possible, especially in comparison with state of the art. Due to the compact firing chamber, rapid heating and, if required, rapid cooling is possible. It is already during preparation of the dental restoration parts for firing that the heating element may be switched on as an energy source. In this situation, the stamp and the receiving plate cover the through-opening in the furnace head.

A cover may be attached to the top of the furnace head. This cover may be opened for rapid preheating during handling, e.g. pushed back, lifted or swiveled away. It is then possible to arrange the dental restoration parts onto the receiving plate while preheating of the firing chamber already occurs. Slight warming of the receiving plate takes place through the stamp, so that the dental restoration parts are already slightly preheated, for example to a temperature slightly above room temperature.

There is a planar and reasonably large handling area. The receiving plate can therefore extend flush with the top of the furnace head. The dental restoration parts may also be prepared on the side of the receiving plate and then quickly moved to the receiving plate.

It is also possible to select an intermediate position below the presentation position to allow gentle preheating of the dental restoration parts. A temperature gradient exists within the upper furnace wall, wherein the firing chamber and the adjacent regions are hot and the upper end of the furnace head is cold or is at least substantially at room temperature. By selecting the height of an intermediate position of the receiving plate with the dental restoration parts, the desired preheating temperature can be adapted to the requirements in a wide range.

It is to be understood that during preheating a cover on the furnace head is closed to prevent energy losses. After completion of the firing process, cooling can be controlled similarly, for example by setting an intermediate position between the working position provided at the bottom and the presentation position provided at the top. Herein, the existing temperature gradient may also utilized beneficially by causing the stamp travel to the height having the desired temperature.

In another advantageous embodiment, a thermal imaging camera is also provided, which, for example, may be attached to the cover or to the lid such that, above the cover, it is directed through an appropriately designed window into the firing chamber and can directly detect the temperature of the dental restoration parts located therein.

The opening and closing mechanism according to the invention is comparatively inexpensive to implement, for example using just one motor. An appropriate gearbox allows controlled movement of both the cover and the receiving plate resting on the stamp.

According to invention, it is also beneficial for the entire control of both the motor(s) and the energy source to be able to be shifted downwards. This also applies to heat sinks of the power electronics, which may be arranged comparatively far below, which increases the cooling efficiency, and also shifting the center of gravity of the dental treatment device according to the invention in a downward direction.

In another particularly advantageous embodiment, the working chamber is able to be placed under vacuum, wherein it is to be understood that an appropriate seal should be provided on the cover or stamp for this purpose. It is also possible to implement controlled air movement in the working chamber, which, for example, may be configured as a firing chamber. Vapors of the dental restoration element produced during firing can thus be withdrawn.

According to the invention, it is also advantageous for immediate and therefore fast acting control of furnace temperature to be possible. A temperature sensor may be provided either in the cover or, if required, directly adjacent to the receiving plate. In both cases, the temperature of the dental restoration parts can be measured continuously and accurately.

If required, an additional temperature sensing element can be installed in the side wall of the furnace head, which allows the temperature of the firing chamber to be measured even when the receiving plate is arranged in the presentation position.

In another embodiment of the invention, a wall drive is provided. The stamp is then stationary and the walls surrounding the working chamber are vertically movable.

Preferably they form a hollow cylinder and can be displaced together.

In the working position, the walls are lifted, surrounding the working area. In the presentation position, they are lowered so that the dental restoration part is freely accessible at least from the side.

A cover, which closes the working chamber at the top, may also be removed if necessary, e.g. swiveled sideways.

BRIEF DESCRIPTION OF THE DRAWINGS

Further advantages, details and features result from the following description of several examples of the invention while making reference to the drawing, wherein.

DETAILED DESCRIPTION

The dental furnace according to the invention as a dental treatment device 10 comprises a furnace head 12 and a cover 14 which is movable in relation to the furnace head 12.

In the furnace head 12 a working chamber is formed in a manner known per se, which in the example embodiment of the dental treatment device or heat treatment device is a firing chamber.

Figure 1:
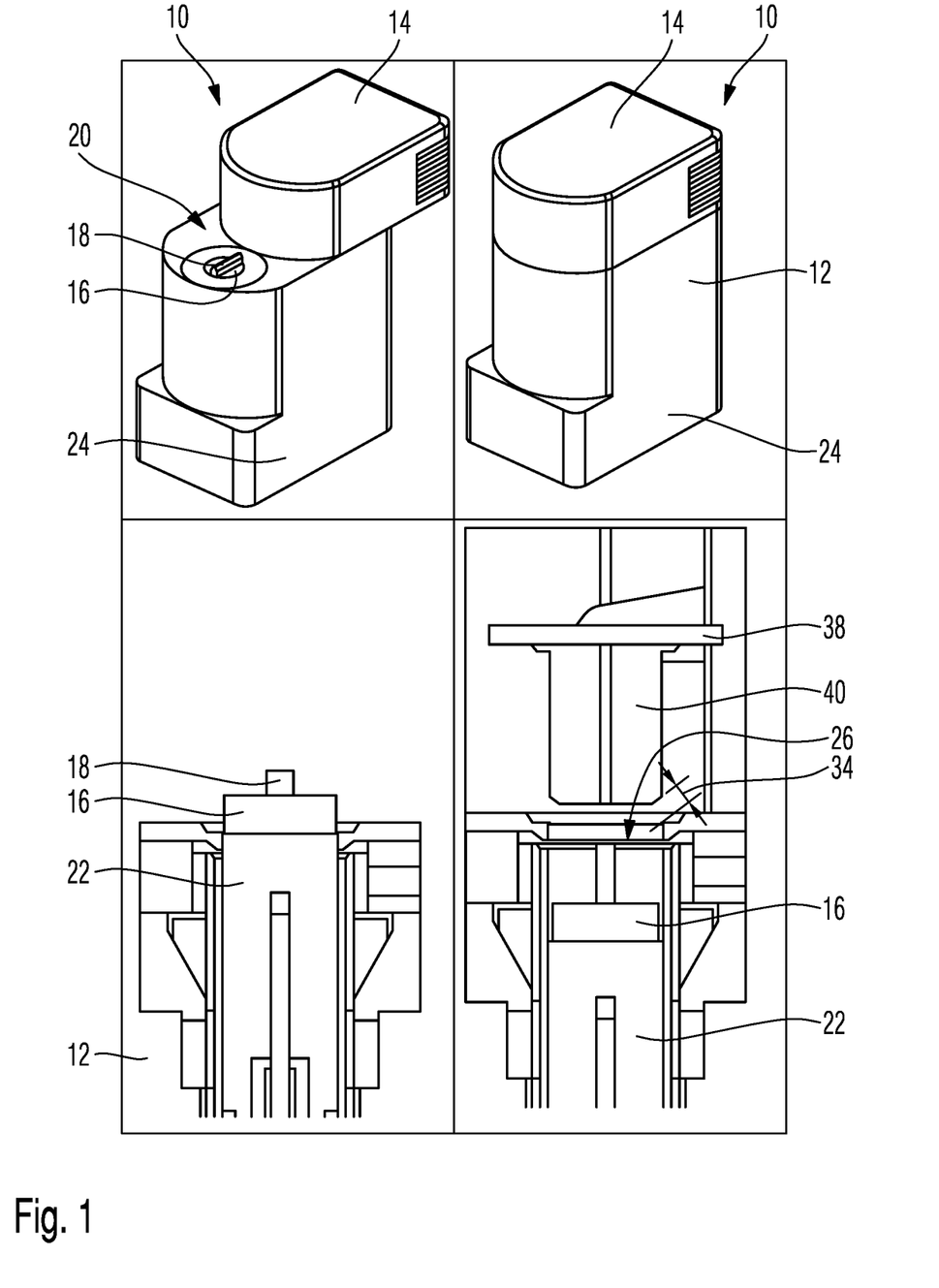
FIG. 1 is a schematic view of an embodiment of a dental treatment device according to the invention, in the form of a dental furnace, in two states.

The state shown in FIG. 1 on the left corresponds to the preparation of the dental treatment device. The cover 14 is open, i.e. moved in a lateral direction against the furnace head 12, and is retracted in this embodiment.

A receiving plate 16 is freely accessible, accommodating a dental restoration part 18, as shown in FIG. 1 on the left.

In this embodiment, the receiving plate 16 is arranged approximately on the surface of the upper side 20 of the upper wall of the furnace head 12.

As shown in FIG. 1, bottom left, the receiving plate 16 is slightly protruding in relation to the upper wall 20. However, it is also possible without further ado to select a flush arrangement.

The receiving plate 16 rests on a stamp 22 which extends upwards starting from the bottom from the dental treatment device, in the position shown, it passes through the firing chamber up to slightly below the top surface 20 of the furnace head.

In the base area 24 of the dental treatment device, the appropriate drive for stamp 22 is provided.

In the example shown, the stamp 22 is solidly formed, having a diameter approximately equal to the diameter of the receiving plate 16. It is to be understood that it is also possible alternatively to choose a smaller diameter for the stamp 22 without further ado. The axis and the stamp may also be provided with holes or a pipe for evacuating or flooding the working chamber with a process gas.

The furnace head 12 comprises a through-opening 26 at the top. This is dimensioned such that both the stamp 22 and the receiving plate 16 can pass through the through-opening 26. In the example embodiment shown, the stamp 22 completely occupies the through-opening 26. In this respect, it blocks the heat passage from the firing chamber 30 located below (cf. FIG. 2) upwards through the through-opening 26.

In the example embodiment shown, the receiving plate may also be moved from below, i.e. from the firing chamber as well as from above, i.e. from the position shown in FIG. 1 on the left, and may be moved into the through-opening.

In this embodiment, the receiving plate 16 may be moved through the through-opening 26.

The position shown in FIG. 1 on the left provides free access of the dental restoration part 18 at the top of the dental treatment device 10. In this respect, this position forms a presentation position.

A working position is provided below the presentation position. In this position, the stamp 22 is lowered such that the receiving plate 16 is located near the firing chamber bottom and the dental restoration parts 18 may be fired in firing chamber 30.

From FIG. 1 on the left it may be seen in which way the stamp 22 can be lowered with the receiving plate 16. In the position shown in FIG. 1 the stamp 22 partially dips into the through-opening 26. A cover 32 approaches the through-opening 26 from above, but in this position a gap 34 remains between the cover 32 and the through-opening 26. However, the receiving plate 16 is surrounded by the already warmed furnace head 12, so that the dental restorations located therein are preheated or, for example, dried.

In the example embodiment shown, the cover 32 consists of a flange 38 and a pin 40. The pin 40 can extend into the through-opening 26, whereas the flange 38 can rest on top 20 of the top head 12. This position may be seen in FIG. 2 on the left. The pin 40 consists of a heat insulating material and closes the furnace head 12 at the top.

Figure 2:
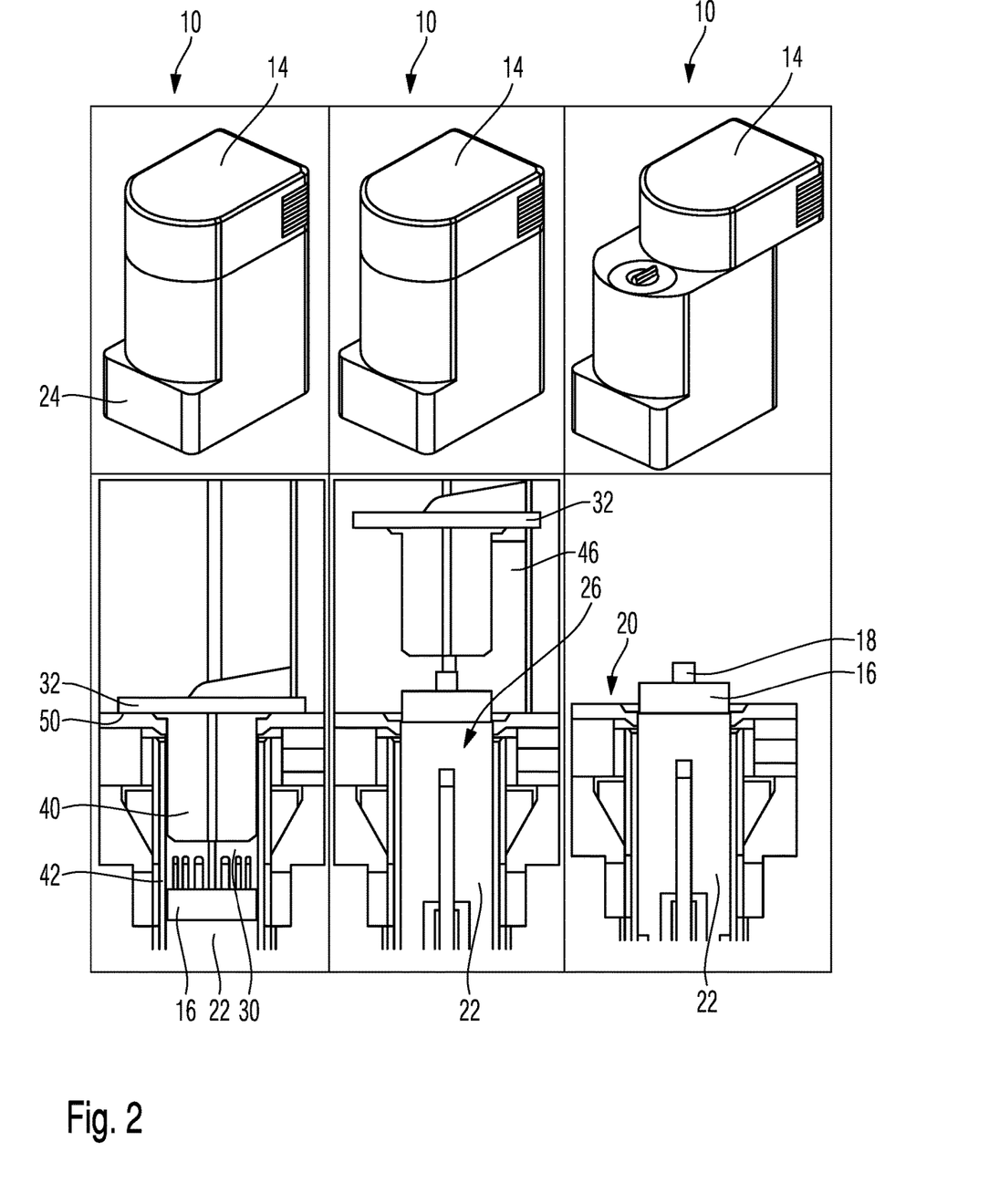
FIG. 2 is the dental furnace according to FIG. 1, in three other states.

The working position is shown on the left in FIG. 2. Herein, the receiving plate 16 extends from the cover 32 spaced apart by a height corresponding to the maximum height of the dental restoration parts. The firing chamber 30 is deliberately kept small.

In the preferred embodiment of the invention, it is provided to adapt the firing chamber to the requirements with regard to its height. For this purpose, the receiving plate 16 is moved so far that the height of the firing chamber 30 is selected to match the dental restoration parts. For example, the height of the firing chamber 30 may be one and a half to three times the height of the dental restoration parts.

In the embodiment according to FIGS. 1 and 2, the firing chamber 30 is surrounded by a cylinder element 42. It extends between heating elements 44 and firing chamber 30 and serves to distribute heat dissipation more evenly and at the same time to protect heating elements 44 from damage.

As can also be seen from the comparison of FIGS. 1 and 2, the cover 32 can be moved vertically. This is done via a cover drive 46, which is accommodated in the cover 14 and covered by it.

In the exemplary embodiment shown, the cover drive 46 is decoupled from the drive of stamp 22 to be able to adjust the firing chamber height. However, it is also possible to operate using a firing chamber having constant height and to electrically or mechanically couple the cover drive and the stamp drive with a gear, a transmission or a spindle. This coupling can also be used, for example, to realize two different but correlated movement velocities for stamp and cover while using an appropriate motor design.

In the left position shown in FIG. 2, the working position, the dental restoration part is fired by switching on the heating element 44. In this position, the cover 32 is placed on the top 20 of the furnace head 12, sealing it by means of a seal 50 thereat. An appropriate seal is provided at the bottom of stamp 22. This allows, for example, to apply vacuum to the firing chamber 30 in the working position. For example, it is subsequently possible to purge the firing chamber 30 with oxygen, nitrogen, argon or another process gas or to exchange the process gas or to work with a process gas introduced under overpressure.

In the position shown centrally in FIG. 2, the cover 32 is lifted off the through-opening 26 and the receiving plate 16 is moved to the upper position. In this position, the stamp 22 upwardly seals the through-opening 26. The dental restoration parts 18 are surrounded by the air inside the cover 14 and are already somewhat cooling down.

After completion of the cooling phase, the cover 14 is pulled back according to the position shown in FIG. 2 on the right. In this case, the cover 32 and the cover 14 are moved sideways such that the dental restoration parts can be positioned freely and exposed in the presentation position and are ready for removal.

Also, in this position the stamp 22 seals against the hot furnace head 12, so that, even in this position, the furnace head does not cool down.

Another embodiment of the dental treatment device 10 according to the invention is shown in FIGS. 3 to 6.

Figure 3:
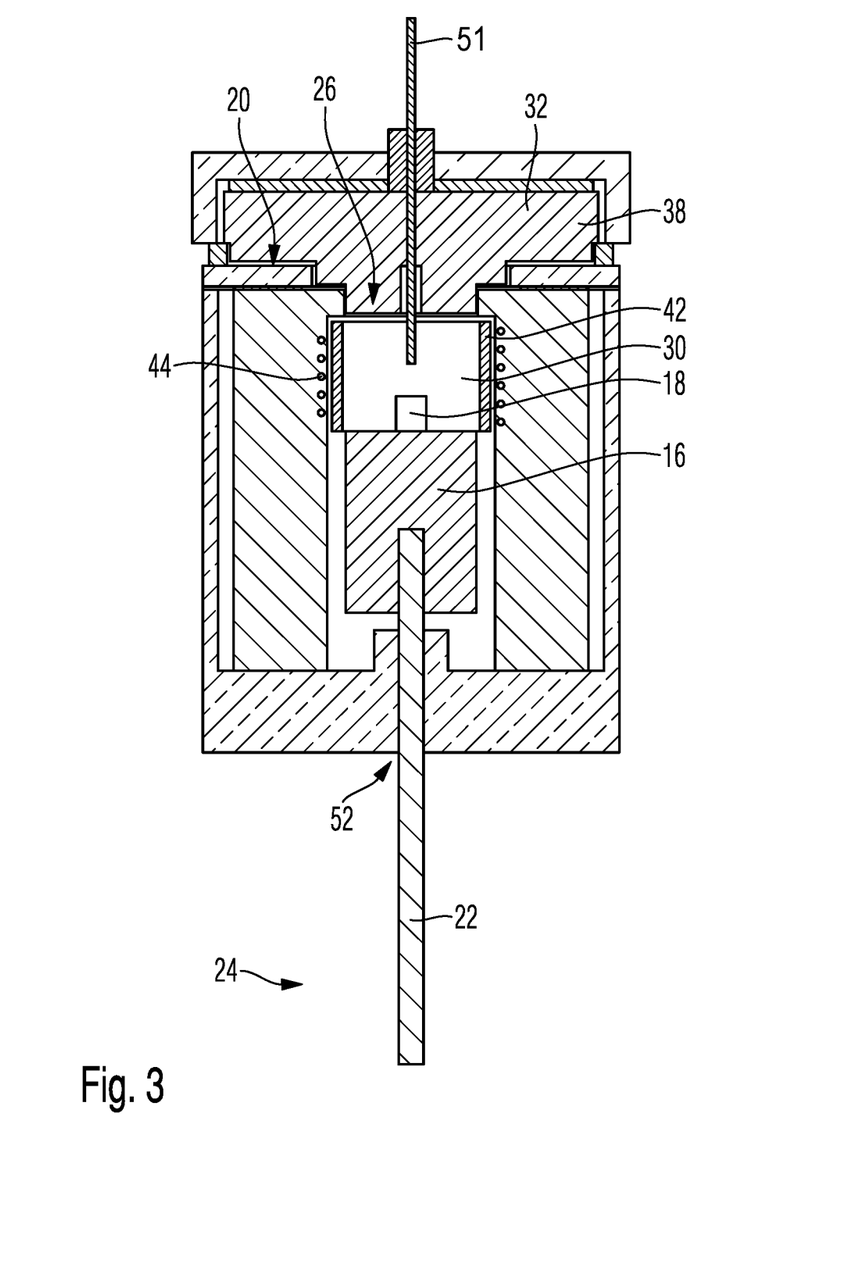
FIG. 3 is a cross section across a dental furnace according to the invention in a first state.

In the position according to FIG. 3, the working position, the cover 32 rests on the upper side 20 of the furnace head 12. The flange 38 is positioned therein while surrounding the through-opening 26, and the pin 40 projects into the through-opening 26.

In this embodiment, a temperature sensor 51 is provided which passes through the cover 32 and projects into the firing chamber 30.

In this embodiment, the receiving plate 16 is also designed in the manner of a cylinder, having a height approximately twice the diameter. Herein, such a comparatively high design shall also be encompassed by the term receiving plate 16.

The stamp 22 supports and guides the receiving plate 16, projecting into the receiving plate 16 from below. It passes through the furnace head 12 at a stamp guide 52, below which, in the base area 24, the stamp drive is provided, which is not shown herein.

A cylinder element 42 as a protective element is provided as a susceptor in the embodiment example shown herein and serves to distribute the introduced thermal energy more evenly. An induction coil for inductive heating annularly extends around the susceptor or cylinder element 42. The cylinder element 42 may also be a direct electrically heated resistance element. The dental restoration part 18 is received and deposited on the upper surface of the receiving plate 16. In this position, the effective height of the cover 32 is selected such that there is good thermal insulation, which roughly corresponds to the thermal insulation of the side walls of the furnace head 12. This may be realized in the known manner, for example, by appropriately formed fireclay or thermal insulation molded pieces, respectively.

In the example shown, the firing chamber is cylindrical and has a diameter of 60 mm, corresponding to the inner diameter of the cylinder element 42. Herein, the set height is 32 mm, which can be adjusted by the vertical movability of the receiving plate 16.

For this purpose it is also possible to extend the cylinder element 42 and the heating element 44 downwards if required.

It is also possible for the heating element 44 to be configured as being separately switchable. In this embodiment, only the upper part shown in FIG. 3 is always switched on and the lower part not shown herein is turned on only if it is required due to the greater height of the dental restoration part 18 and the corresponding lowering of the receiving plate 16.

Figure 4:
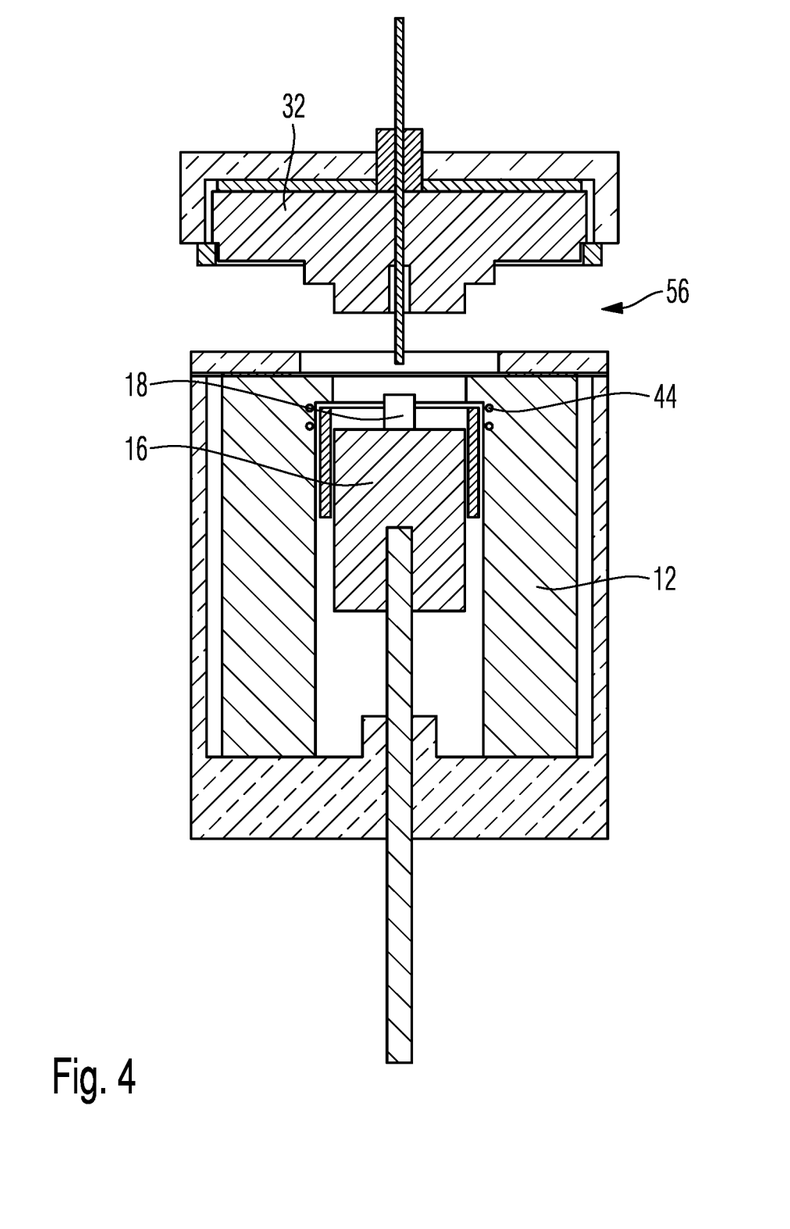
FIG. 4 is the embodiment according to FIG. 3, but in a different state.
Figure 5:
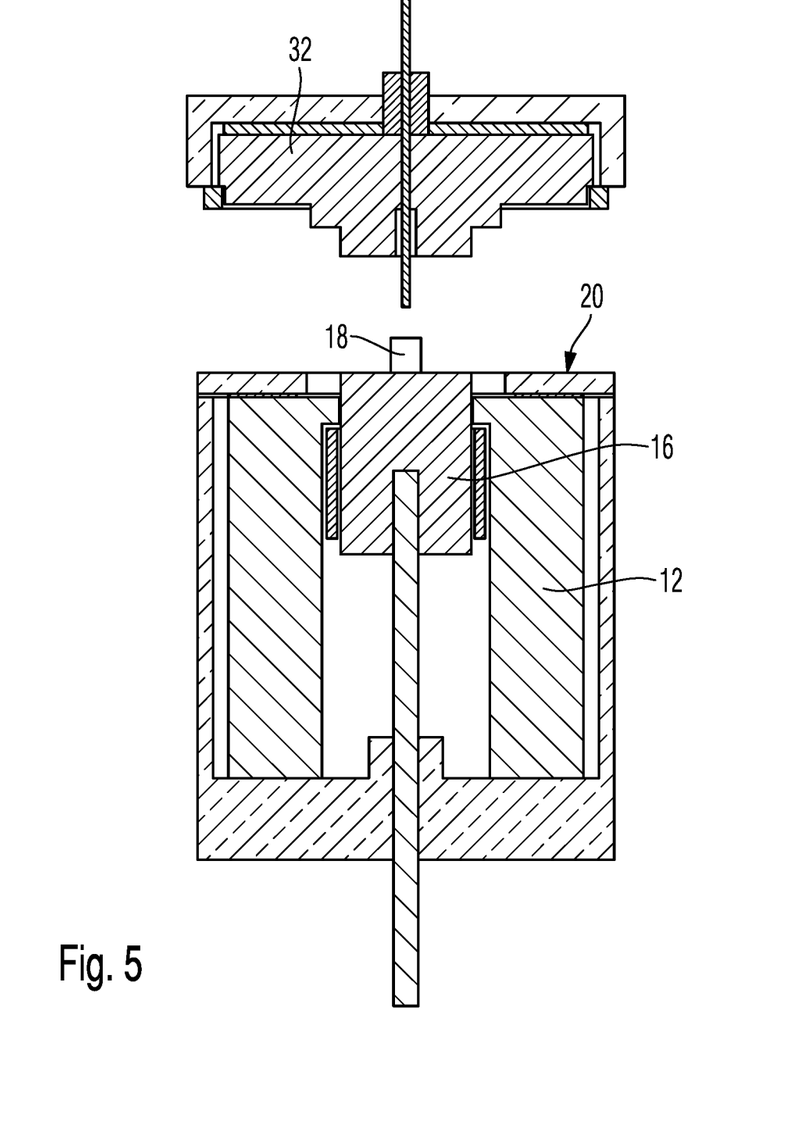
FIG. 5 The embodiment according to FIGS. 3 and 4, but in another state.

FIG. 4 shows an intermediate position between the working position shown in FIG. 3 and the presentation position shown in FIG. 5. In this intermediate position, both preheating is possible since the heating elements 44 already surround the dental restoration parts 18, and slow cooling following completion of the firing cycle. In this position, the cover 32 is lifted so that there is a gap 56 between the furnace head 12 and the cover 32.

It is also possible to first lift the cover and then to move the stamp upwards.

FIG. 5 shows the presentation position. The receiving plate 16, with its top side, extends flush with the top surface 20 of the furnace head 12, and the cover 32 is lifted considerably further in the upward direction.

Alternatively, it is also possible to move the cover 32 sideways to further improve accessibility.

Figure 6:
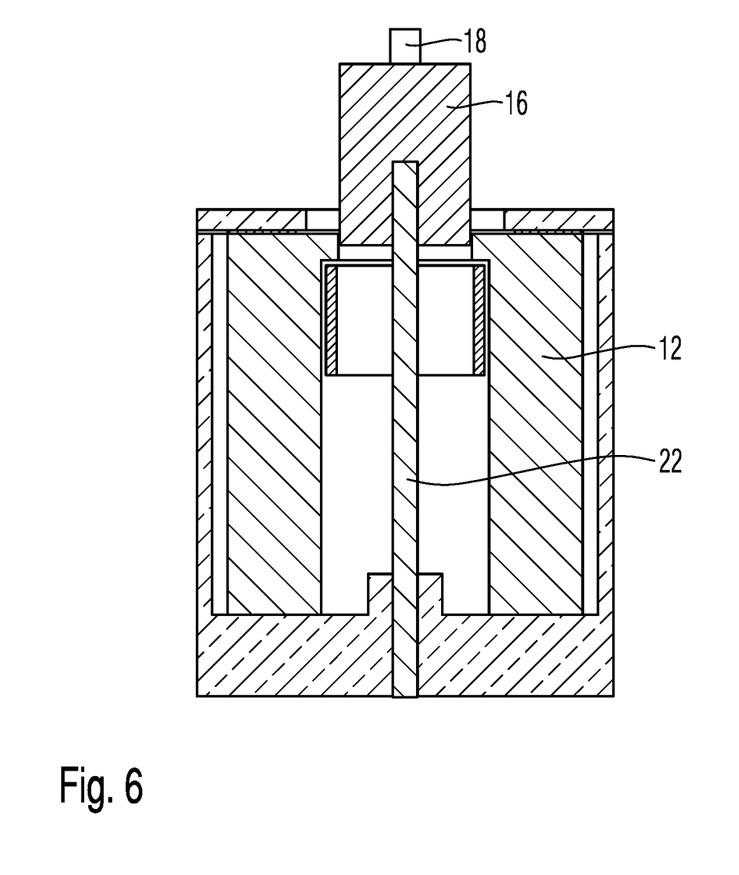
FIG. 6 is a cross section of another embodiment of a dental furnace according to the invention.

FIG. 6 shows how an even higher presentation position can be achieved. This position is particularly advantageous, for example, if automatic loading and unloading is desired.

Figure 8A:
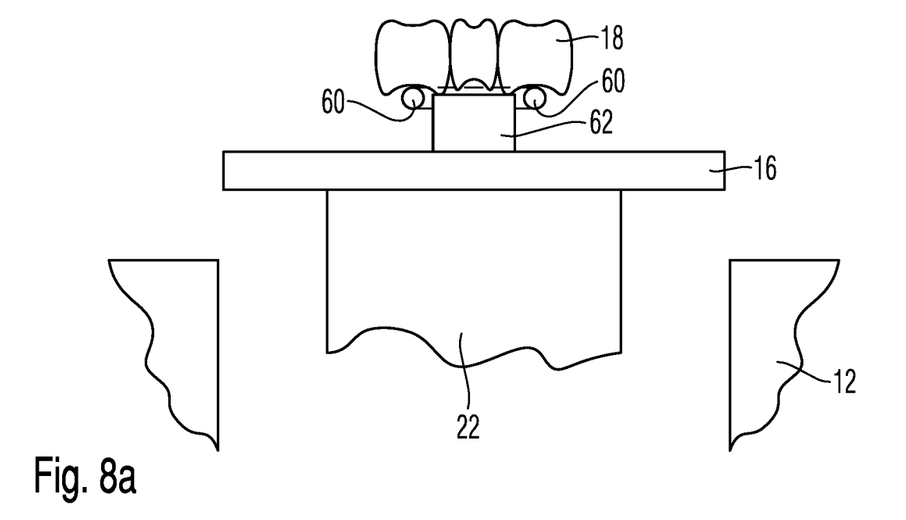
FIGS. 8a and 8b are schematic illustrations of a detail of another embodiment of the dental treatment device according to the invention, in two states.
Figure 8B:
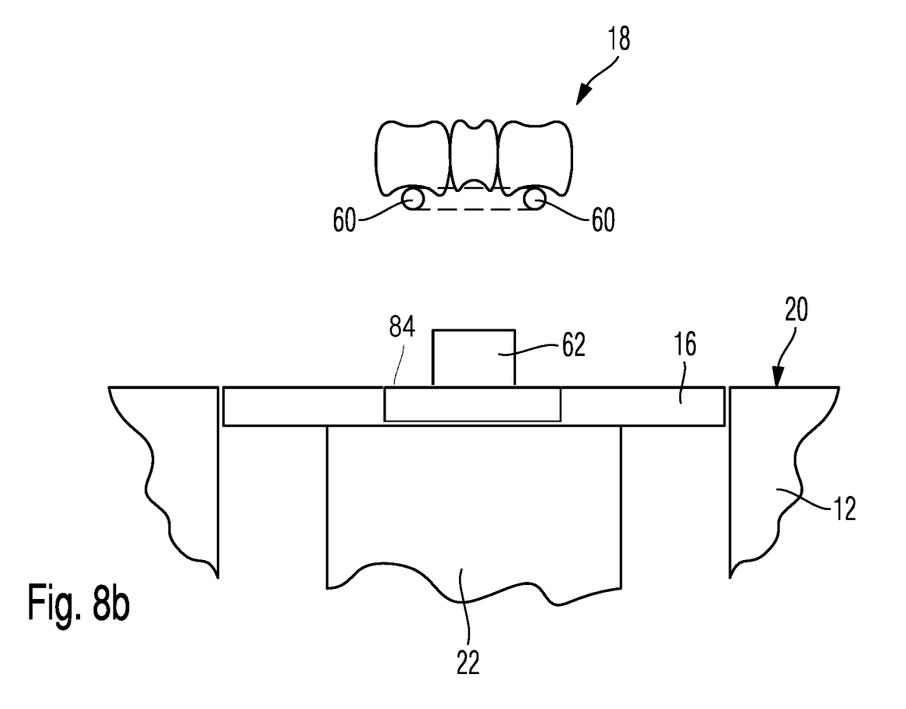

Such an approach is schematically shown in the FIGS. 8*a* and 8*b*. By combining a loading fork and the stamp drive, a dental restoration part may be placed onto the receiving plate 16 or may be removed therefrom.

Figure 7A:
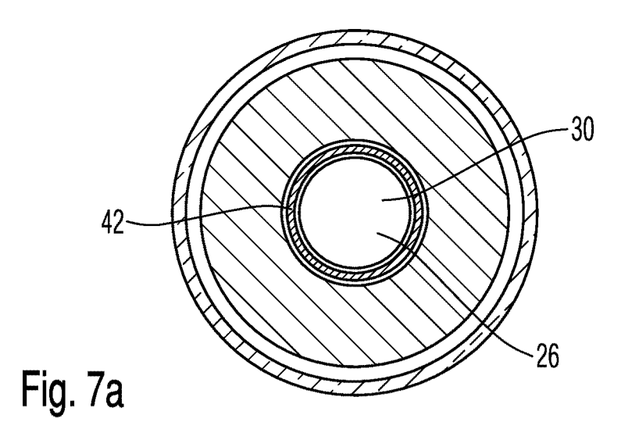
FIG. 7a, 7b, 7c are horizontal sections across three other embodiments of a dental treatment device according to the invention.

FIG. 7*a* shows an example of a possible shape of the receiving plate 16 and the firing chamber 30. In this embodiment, they are circular.

Figure 7B:
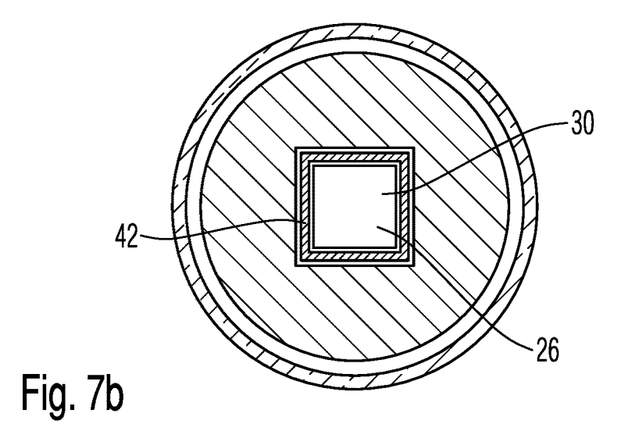
Figure 7C:
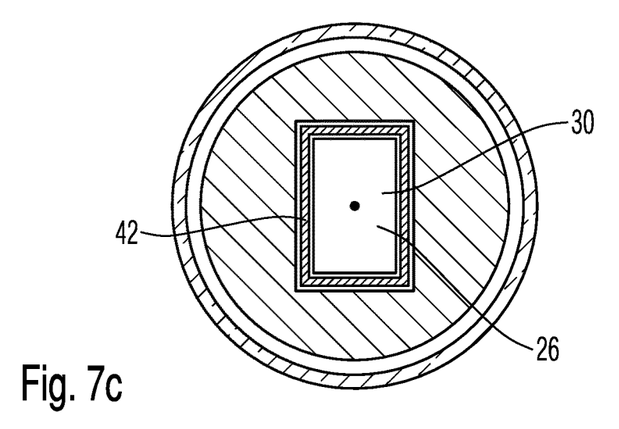

In contrast, in the embodiment according to FIG. 7*b*, the firing chamber 30, the receiving plate 16 and the cylinder element 42 are provided with a square cross-section, and a rectangular cross-section, according to FIG. 7*c*.

Those embodiments are only to be understood as examples, even though any other form of the firing chamber 30 and the corresponding parts mentioned herein is possible without leaving the scope of the invention.

It is preferred for the outer shape of the furnace head 12 of FIG. 1 is at least partially round, or according to FIG. 7a-7c circular. In the case of a rectangular firing chamber, however, it is also advantageous to make the outer contours to be correspondingly rectangular, to reduce complexity of the components and, for example, to realize thermal insulation of the firing using plate material.

FIG. 8a shows in which way automatic loading and unloading of a dental treatment device according to the invention is possible. The stamp 22 with the receiving plate 16 is in the upper position, the presentation position. The dental restoration part 18 is gripped by a fork 60 of the loading device. Herein, the dental restoration part is supported on the fork 60, but also on a support body 62, which rests on the receiving plate 16 and has a smaller diameter than the distance between the fork teeth.

In contrast, according to FIG. 8b, stamp 22 is moved downwards with the receiving plate 16. The support body 62 remains on the receiving plate 16, but no longer is in contact with the dental restoration parts 16, now resting exclusively on the fork 60 and can be moved sideways. The fork 60 can be moved sideways. Receiving plate 16 may include a balance 84 onto which dental restoration parts may be placed, wherein weight measured by the balance after transfer to the dental treatment device 10 is indicated thereon.

According to the invention, it is preferred for loading and unloading to take place automatically, in this embodiment.

According to another embodiment not shown in the drawings, it is provided for the cover 32 to be supported by legs on the receiving plate 16. In this simplified embodiment, a separate cover drive may be omitted, but has the disadvantage that the height of the firing chamber cannot be changed or can only be changed by changing the length of the supporting legs, by replacement thereof.

In another embodiment it is provided for the receiving plate to be realized not planar, but molded. This can be realized, for example, by a supporting body according to FIGS. 8a and 8b, or by corresponding elevations. Alternatively, recesses may also be provided, which can then accommodate the dental restoration parts, if necessary on a specific firing plate.

Furthermore, it is also possible to provide the receiving plate with a turntable. Such a turntable can have advantages in terms of an even distribution of heating. This can be advantageous, for example, if a microwave heating system is used or if, for example, an (IR) camera is to capture all objects. The objects can be rotated past a stationary camera fixed, for example, exterior of the cover 32 on a viewing window.

The drive of stamp 22 can be provided in any suitable manner, for example electrically, mechanically by means of a manually operated lifting lever or pneumatically or hydraulically. It is preferably decoupled from the cover drive 46.

The cover 14 can preferably be pushed backwards and forwards manually, but can also be moved by motor.

Figure 9:
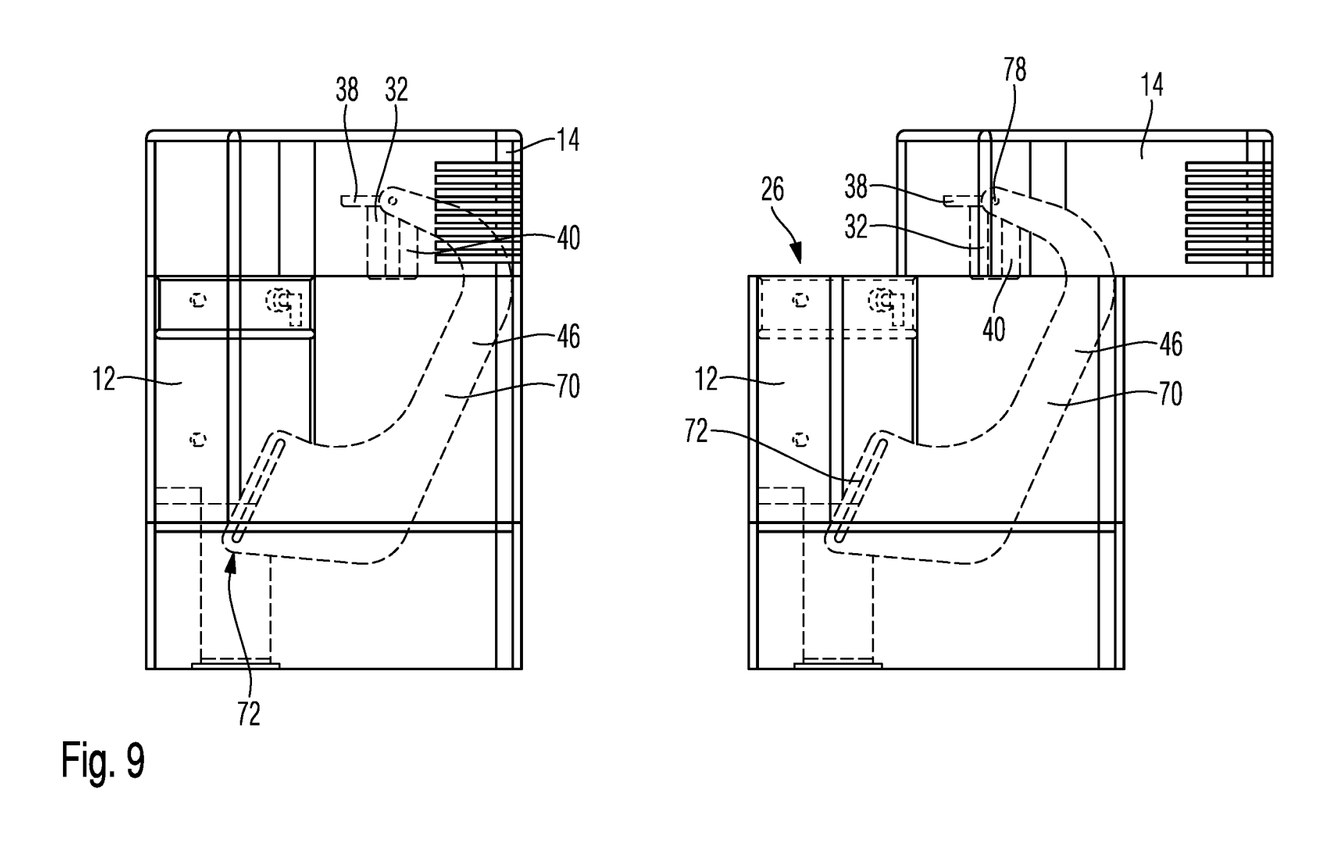
FIG. 9 is another embodiment of the inventive dental treatment device according to the invention, in two states.

Another embodiment of a dental furnace according to the invention may be seen schematically from FIG. 9. Herein, the dental furnace according to the invention is shown in a lateral view as being semi-transparent. A cover 32 consists of a flange 38 and a pin 40 which is to enter a through-opening 26 in the furnace head 12.

In this embodiment, a dedicated cover drive 46 is provided. The cover drive 46 comprises a swivel arm 70, which also comprises a vertical bearing 72. The vertical bearing 72 allows the swivel arm 70 to be moved upwards and downwards, preferably to be moved obliquely, i.e. in a direction parallel to the swivel arm 70. Moreover, swiveling the swivel arm 70 around a bearing point 74 is also possible.

The swivel arm 70, at a swivel bearing 78 at its upper end, carries the cover 32. In the illustration according to FIG. 9 the cover 32 is in the open position, i.e. exposing the through-opening 26 of the furnace head.

To close the through-opening 26, the swivel arm 70 may be swiveled around bearing point 74 such that the cover 32 is suspended above the through-opening 26 and is countersunk thereinto with the pin 40 by overall lowering the swivel arm downwards on the vertical bearing 72.

In the open position of cover 32 shown in FIG. 9, the lid 14 can be moved to the open position, as shown in the illustration on the right, as well as to the closed position, as shown in the illustration on the left. In the illustration on the right, i.e. with the cover pushed back, the receiving plate 16, not shown herein, including the dental restoration part is moved upwards into the presentation position.

In the presentation position, at least the dental restoration parts protrude from the furnace head 12 such that they can easily be removed from the receiving plate 16 and new dental restoration parts can be installed on the receiving plate 16.

Figures 10, 11:
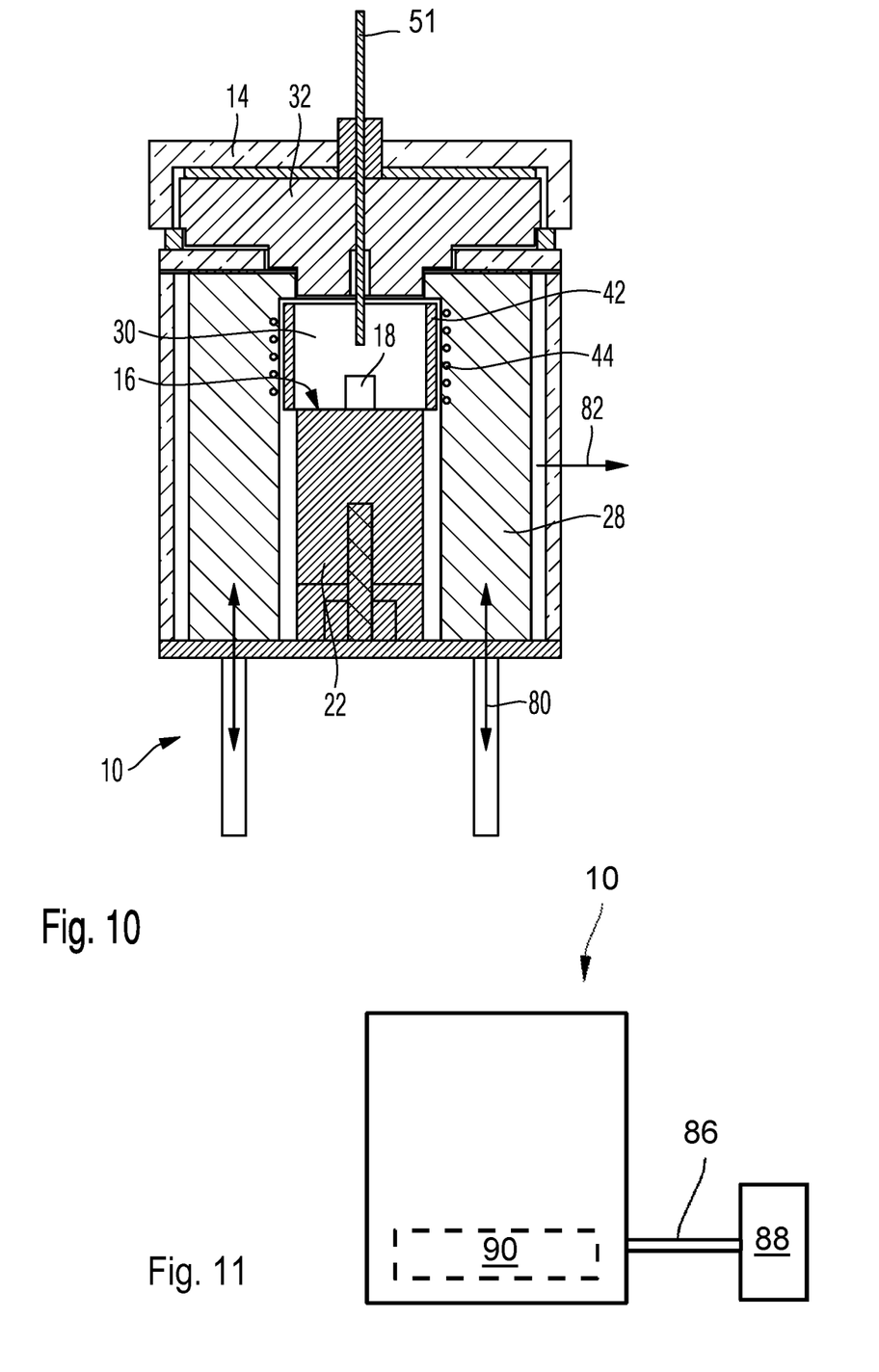
FIG. 10 is another embodiment of the dental treatment device according to the invention having reversed the kinematic movement.
FIG. 11 shows the control device and pressure source for the dental treatment device

From FIG. 10, another embodiment of the dental treatment device 10 according to the invention may be seen. In this solution, the stamp 22 is fixed and the lateral furnace walls 28 may be moved vertically.

As in the example embodiments described above, the furnace walls 28 with the heating elements 44 surround the firing chamber 30. In the firing chamber 30, a dental restoration part 18 is centrally arranged on a receiving plate 16, which, in the present example, is integrated in the stamp 22.

The cover 32 rests on the furnace walls 28, thus upwardly closing off the firing chamber 30.

The furnace walls 28 are equipped with a vertical drive 80. When they are lowered, the stamp 22 with the support plate 16 is located on the level of the upper side of the furnace walls 28. If required, the furnace walls 28 may also be lowered further so that the stamp 22 protrudes from the top of the furnace walls 28.

The cover 32 can be swiveled away or lifted off, as required. Even without moving the cover 32, lateral access to the firing chamber 30 is possible for removing the dental restoration part 18 and inserting a new dental restoration part to be fired.

Removal of the dental restoration part 18 is indicated by arrow 82.

This embodiment has the advantage that the dental restoration part 18 remains in place in a vibration-free manner, while the firing chamber walls, i.e. the furnace walls 28, can be lowered. The lowered position is the presentation position, and if the furnace walls 28 are in the upper position, i.e. surrounding the firing chamber 30 and the dental restoration part 18, the working position exists.

Another advantage of this solution resides that the hot inner surfaces of the furnace walls 28, which are equipped with heating elements 44, extend laterally adjacent to the stamp when the furnace walls 28 are lowered.

This is the first time they are completely protected from being touched.

Rapid cooling of the dental restoration part 18 is also ensured, as the stamp 18 can easily absorb the residual heat of the heating elements 44.

The cylinder element 42, which is also provided in this embodiment, may, for example, be configured as a quartz tube and may be lowered together with the heating elements 44 and the furnace walls 28.

FIG. 11 shows the dental treatment device automatically controlled by a controller or control device 90 and having a pressure source 88 provided to the working chamber by which the working chamber may be put under overpressure or under vacuum, wherein the stamp comprises a line 86 which communicates with the pressure source and which line is for evacuating and flooding the working chamber.

The invention claimed is:

1. A dental treatment device comprising
an energy source which is arranged at least partially in or on a working chamber (30) for the treatment of a dental restoration part (18),
a stamp (22) which is movable in relation to the dental treatment device and which comprises a receiving plate (16),
wherein the working chamber (30) has a through-opening (26) at the top, into which the receiving plate (16) is at least partially movable, and wherein the receiving plate (16) is configured to hold dental restoration parts on its top surface facing the through-opening (26),
wherein a drive is provided for the transfer of the stamp from at least one working position into at least one presentation position, and vice versa,
wherein the at least one presentation position is above the through-opening (26),
wherein a cover (32) is mounted or hinged or both mounted and hinged on the dental treatment device, by which either the through-opening (26) or the working chamber (30) is closable or both the through-opening and the working chamber are closable, and
wherein the cover (32) is coupled to the stamp (22) by a gear, transmission or spindle, and closes the through-opening (26) and/or the working chamber (30), when, at the same time, lowering the receiving plate (16) into the working position, by the gear, transmission or spindle.

2. The dental treatment device according to claim 1,
wherein the stamp (22) with the receiving plate (16) is configured for lifting from bottom to top across the working chamber (30) and is configured for lifting beyond the working chamber and lowered through the working chamber.

3. The dental treatment device according to claim 1,
wherein the stamp (22) can be moved upwards through the through-opening (26) up to a presentation position, in which the dental restoration parts (18), directly or via additional supports, are placed on the receiving plate and/or removed from the receiving plate (16) mechanically or manually, the movement upwards is automatically controlled by a controller.

4. The dental treatment device according to claim 3, wherein the movement mechanically is with a motor.

5. The dental treatment device according to claim 1,
wherein, in the presentation position, the stamp (22) closes the through-opening (26), leaving a gap for a lateral play of movement, and/or
wherein the stamp (22) and/or the receiving plate (16) and/or the through-opening (26) are formed circular or square or oval or rectangular, also having rounded corners.

6. The dental treatment device according to claim 1,
wherein the cover (32) comprises a cover drive (46) by which the cover is able to be lifted from the through-opening (26) and subsequently is able to be swiveled away or moved away substantially horizontally, vertically or obliquely upwards and/or
wherein a cooling gradient of the dental treatment device is controllable by the cover drive, by setting the current distance of the cover (32) from the through-opening (26).

7. The dental treatment device according to claim 1,
wherein the working chamber (30) comprises a cylinder element (42) which extends at least partially between the receiving plate (16) and the energy source and/or
wherein the dental treatment device is configured as a sintering furnace, press furnace or kiln, the energy source is designed as a heating element, and the working chamber is designed as a firing chamber (30) or pressing chamber.

8. The dental treatment device according to claim 1,
wherein a cylinder element (42) surrounding the working chamber (30) or arranged on an outer circumference thereof of the working chamber (30), serves as an energy source element, and
wherein the energy source element is configured as an electrical resistance heating element comprising molybdenum silicide or silicon carbide, or as an induction heating element, if required with a susceptor, as an infrared heating element, as an energy source heated by microwaves or other energy source, or
wherein the energy source element is configured as a light emitting unit or as a combination of a light emitting unit and a heating element.

9. The dental treatment device according to claim 1,
wherein at least a portion of the energy source element (44) is arranged on the receiving plate (16) for heating and/or exposing dental restoration parts (18) from below and/or on the upper wall of the working chamber (30) for heating and/or exposing dental restoration parts (18) from above.

10. The dental treatment device according to claim 1,
wherein the working chamber (30) is substantially cylindrical, having a diameter between 42 mm and 120 mm and a height between 22 mm and 100 mm or having a diameter between 50 mm and 70 mm and a height between 30 mm and 50 mm.

11. The dental treatment device according to claim 1,
wherein the working chamber (30), when configured as a firing chamber, in the working position, is changeable in size or in height, in adaptation to the requirements of the dental restoration parts to be treated by vertically moving the stamp (22) with the receiving plate (16).

12. The dental treatment device according to claim 1,
wherein the working chamber (30) is sealed to the outside and
wherein a pressure source is provided to the working chamber (30) by which the working chamber may be put under overpressure or under vacuum,
wherein the stamp comprises a line which communicates with the pressure source and which line is for evacuating and flooding the working chamber (30).

13. The dental treatment device according to claim 1,
wherein the receiving plate (16) has a rotary plate, recesses or both a rotary plate and recesses.

14. The dental treatment device according to claim 1,
wherein a balance, onto which dental restoration parts (18) may be placed, is arranged in the receiving plate (16),
wherein weight measured by the balance after transfer to the dental treatment device (10) is indicated thereon.

15. A dental treatment device comprising
an energy source which is arranged at least partially in or on a working chamber (30) for the treatment of a dental restoration part (18),
a stamp (22) with a receiving plate (16) and furnace walls (28), which surround the working chamber,
wherein the working chamber (30) comprises a through-opening (26) at the top, and wherein the receiving plate (16) is configured to hold dental restoration parts on its top surface facing the through-opening (26),
wherein a wall drive (80) is provided for moving the walls (28) from at least one working position into at least one presentation position and vice versa,
wherein in the at least one presentation position, the receiving plate is above the through-opening (26), and
wherein a cover (32) is mounted on and/or hinged on the dental treatment device, with which cover the through-opening (26) and/or the working chamber (30) is closable.

16. The dental treatment device according to claim 15, wherein the wall drive comprises a vertical drive.

* * * * *